D. B. VAN DORN & J. T. WHITEHOUSE.
PRISON CELL DOOR MECHANISM.
APPLICATION FILED JUNE 6, 1910.
1,007,316.
Patented Oct. 31, 1911.
9 SHEETS—SHEET 1.
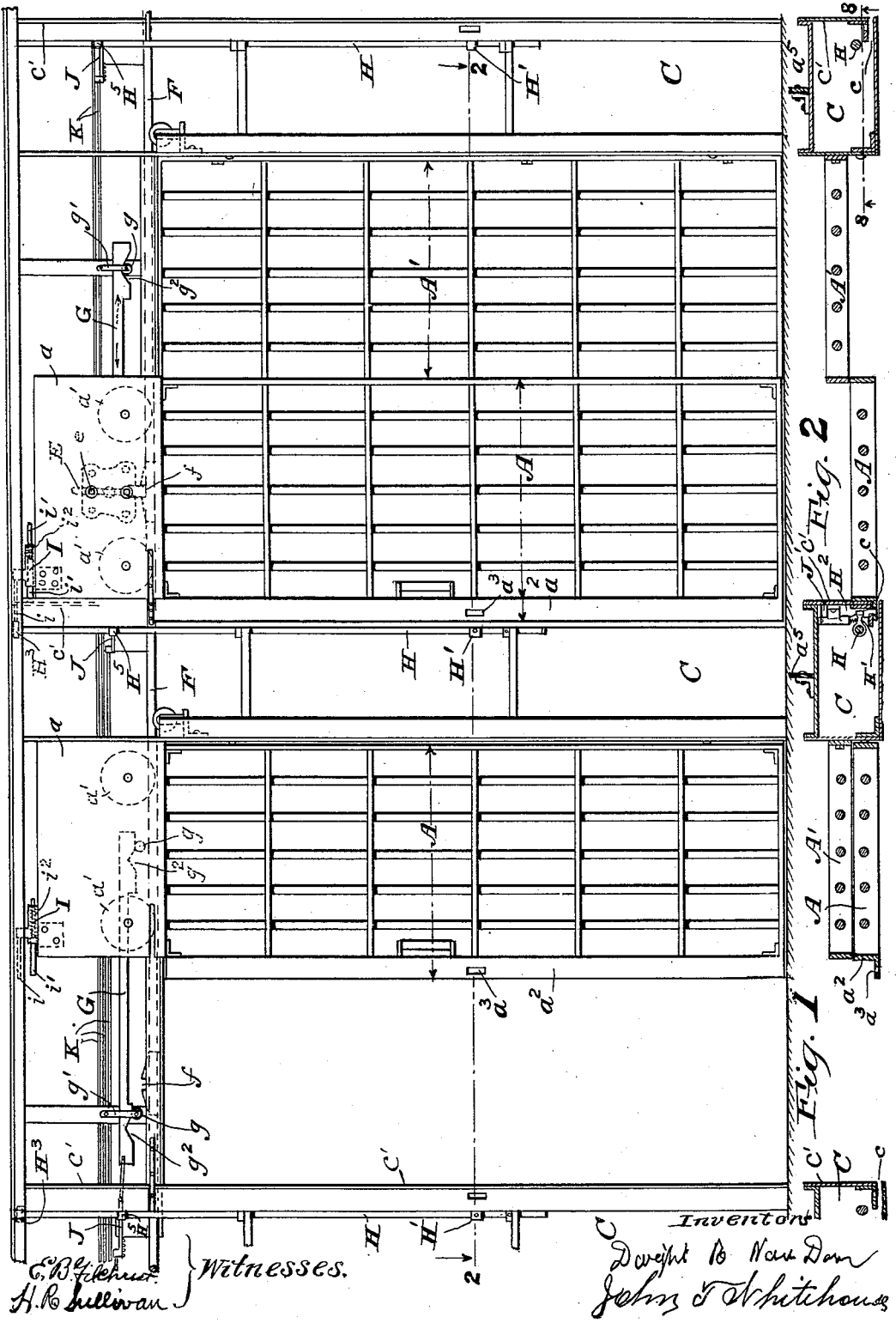

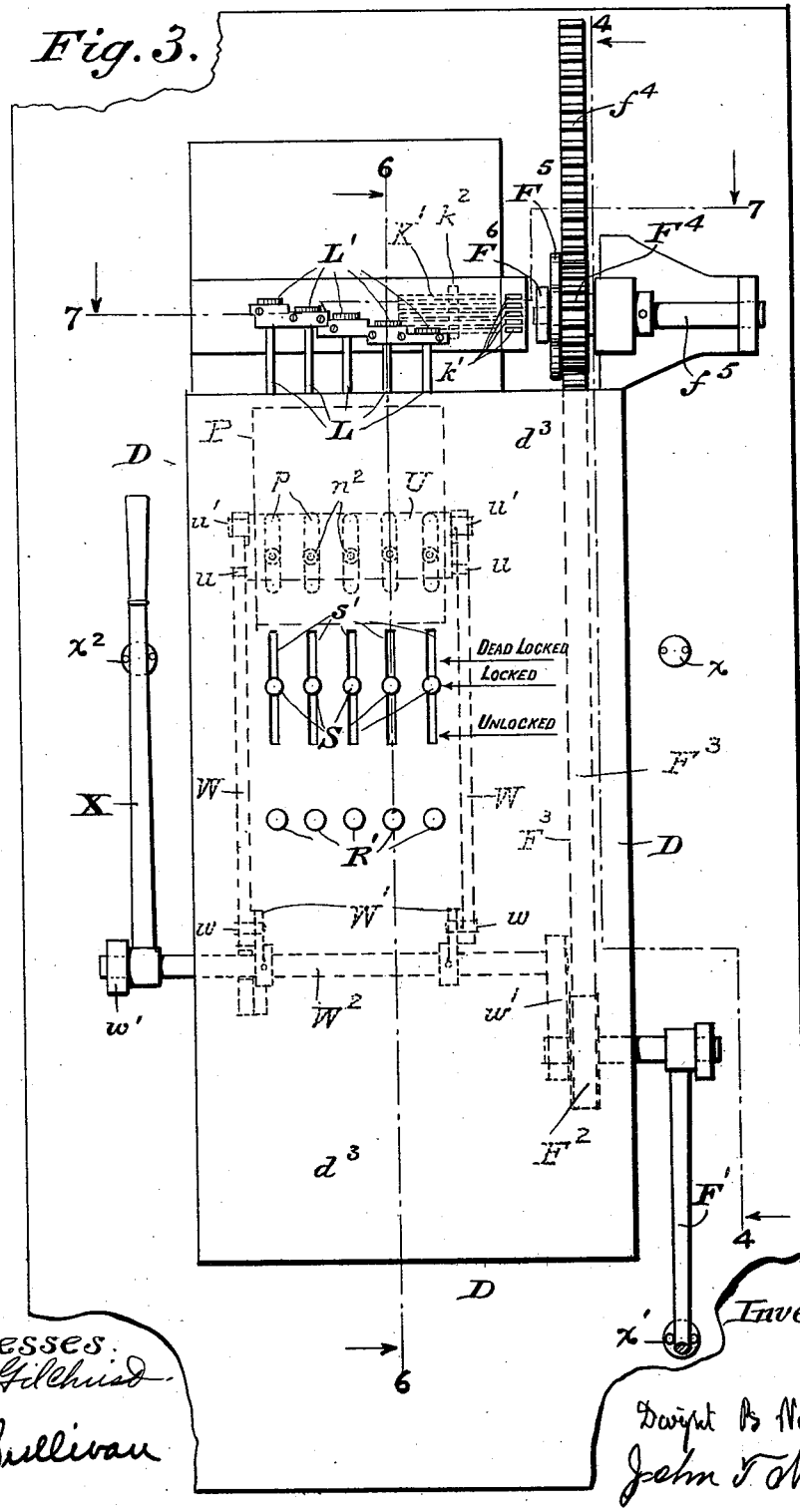

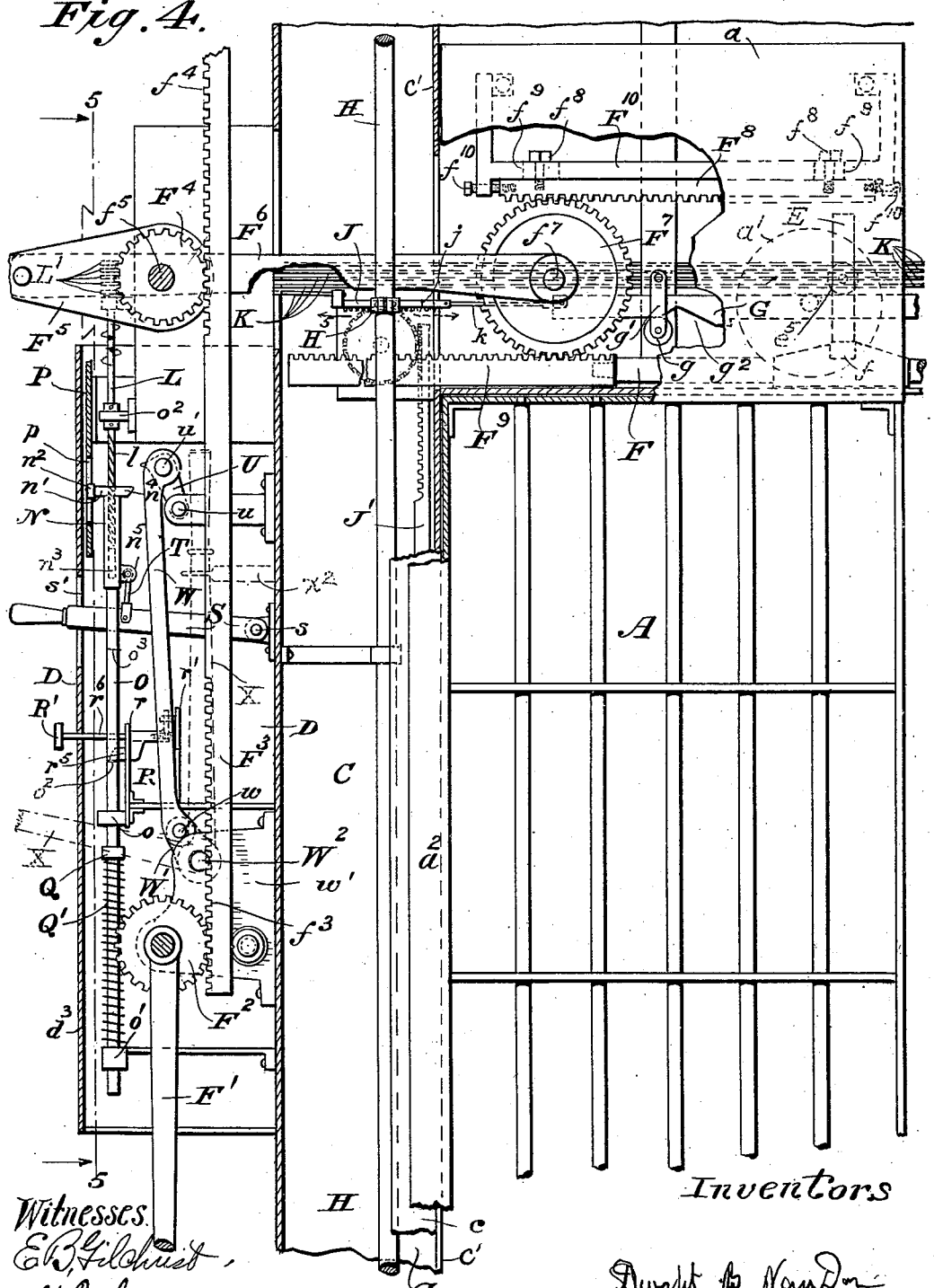

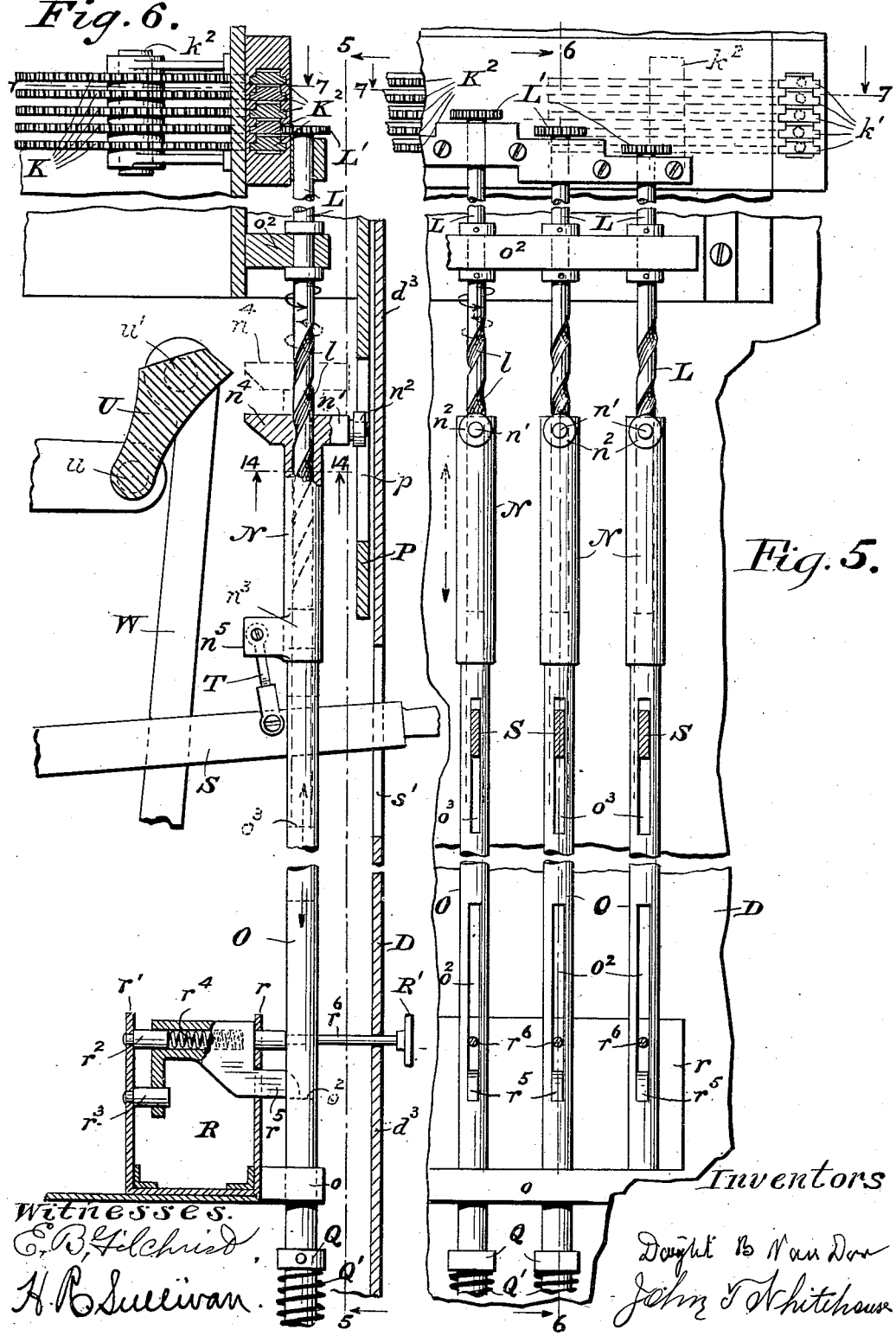

D. B. VAN DORN & J. T. WHITEHOUSE.
PRISON CELL DOOR MECHANISM.
APPLICATION FILED JUNE 6, 1910.
1,007,316.
Patented Oct. 31, 1911.
9 SHEETS—SHEET 5.
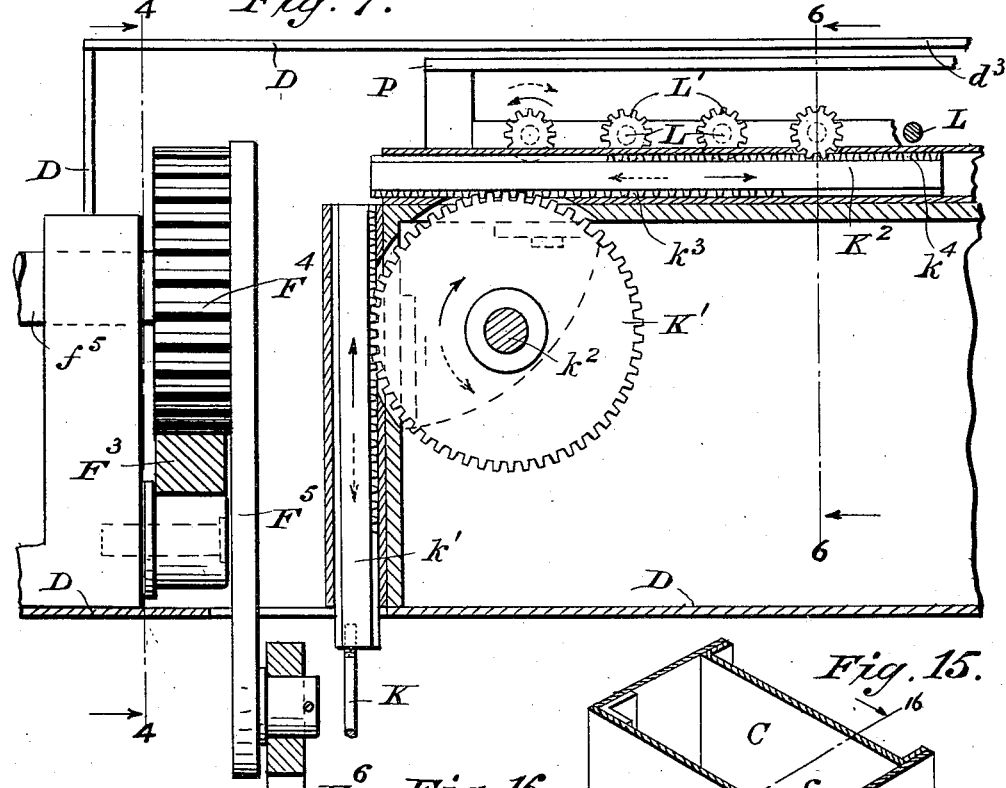
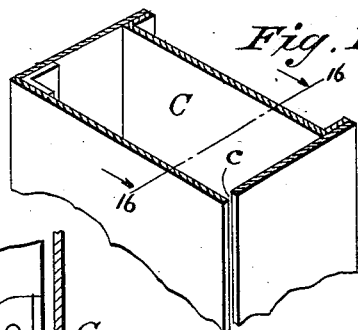
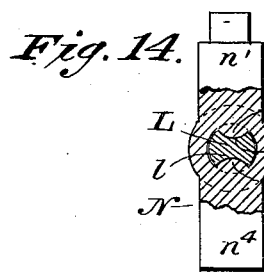
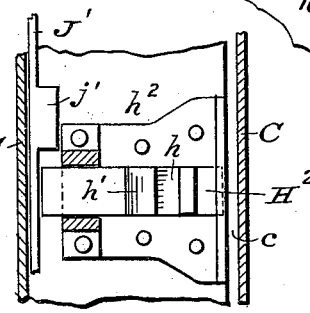
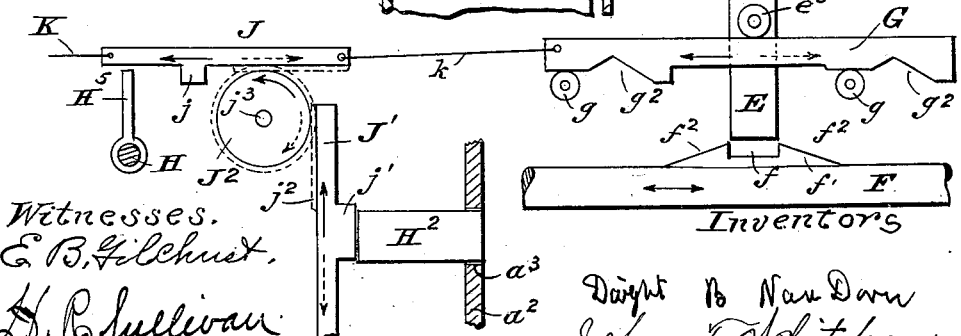
Witnesses.
E. B. Gilchrist.
H. R. Sullivan.
Inventors
Dwight B. Van Dorn
John T. Whitehouse D. B. VAN DORN & J. T. WHITEHOUSE.
PRISON CELL DOOR MECHANISM.
APPLICATION FILED JUNE 6, 1910.
1,007,316.
Patented Oct. 31, 1911.
9 SHEETS—SHEET 6.
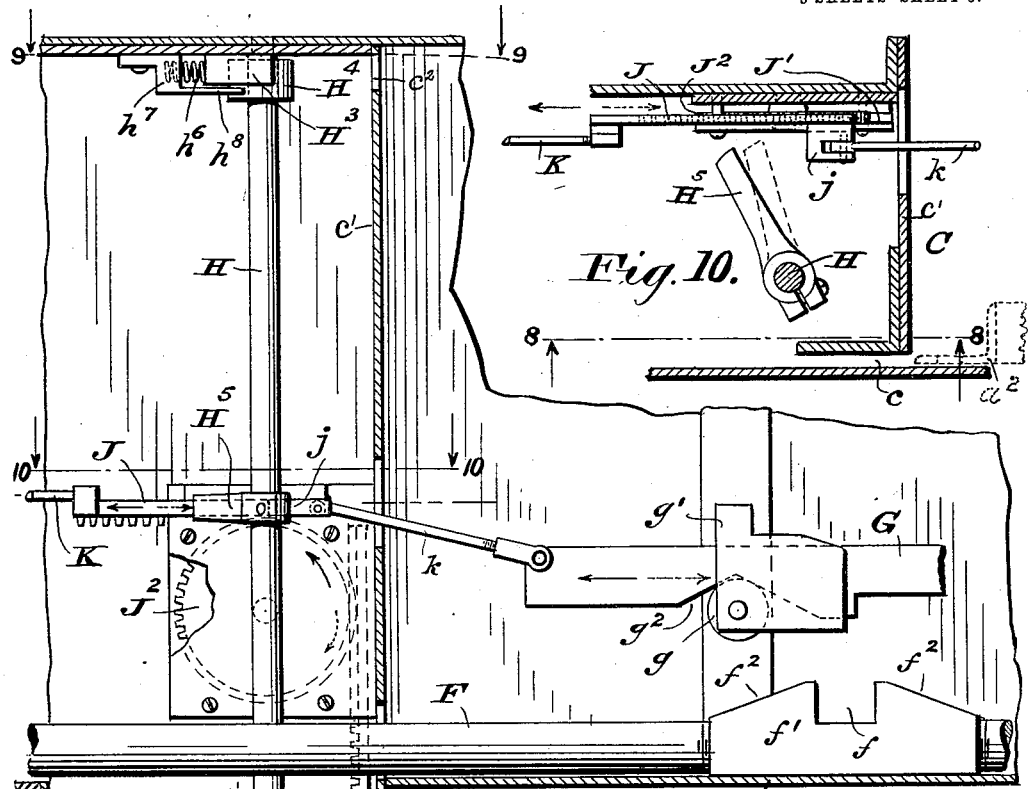
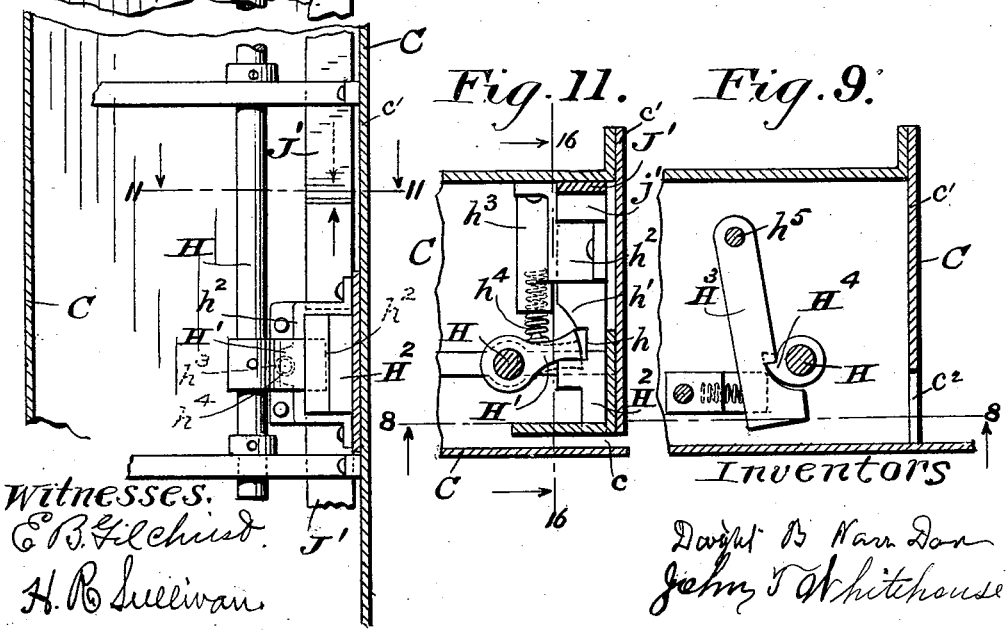

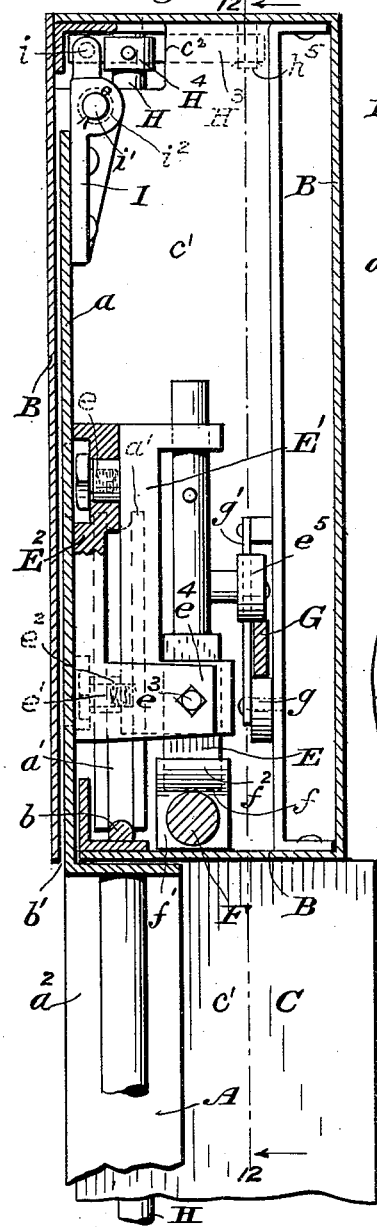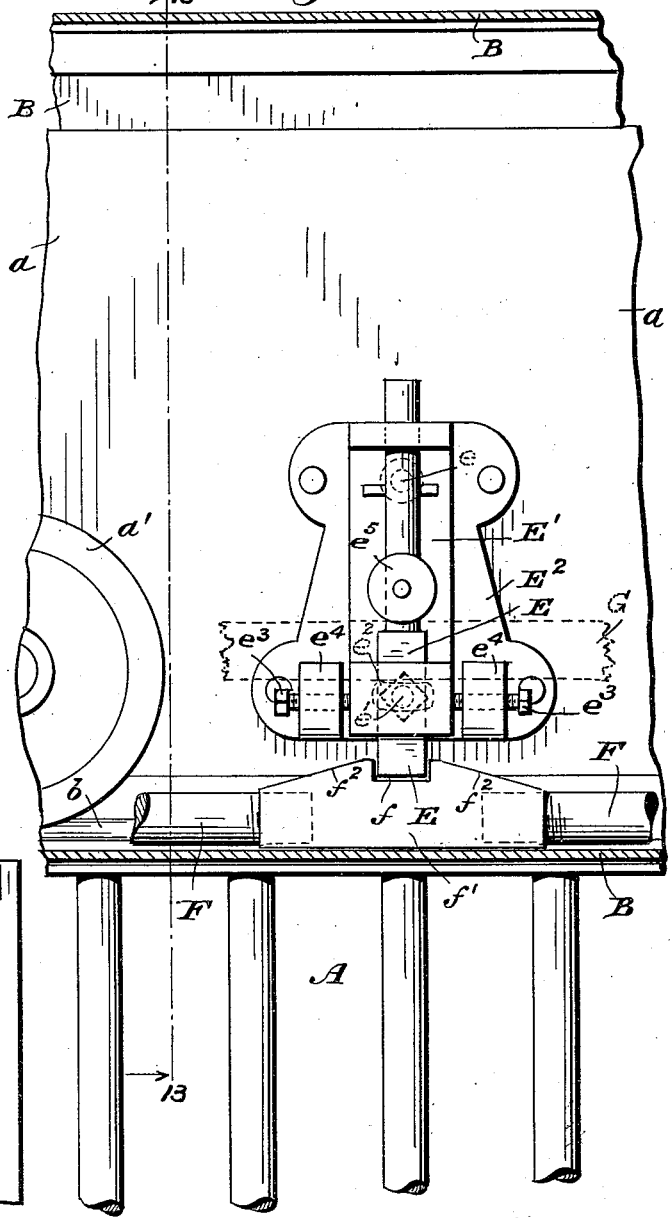

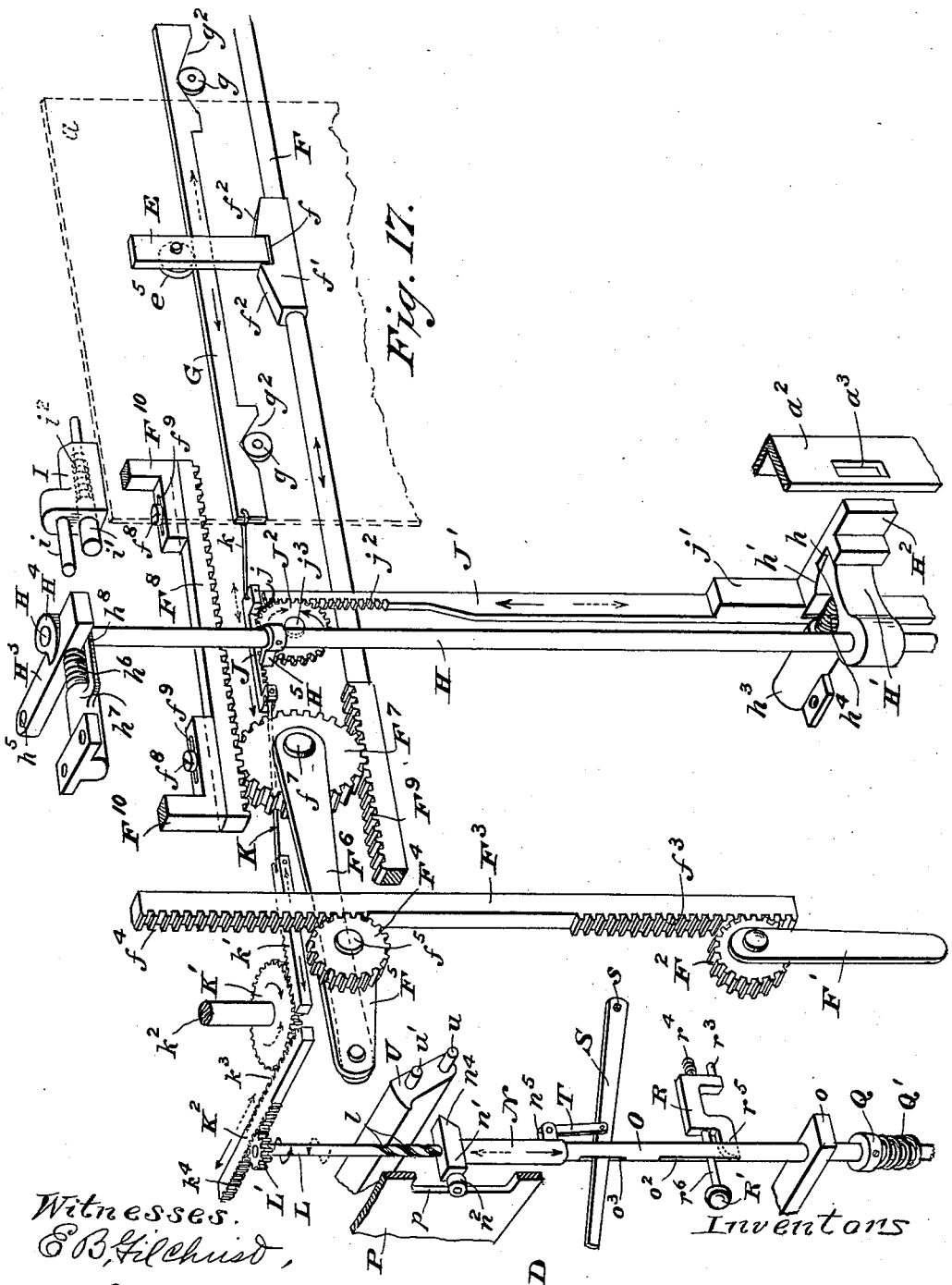

D. B. VAN DORN & J. T. WHITEHOUSE.
PRISON CELL DOOR MECHANISM.
APPLICATION FILED JUNE 6, 1910.
1,007,316.
Patented Oct. 31, 1911.
9 SHEETS—SHEET 9.
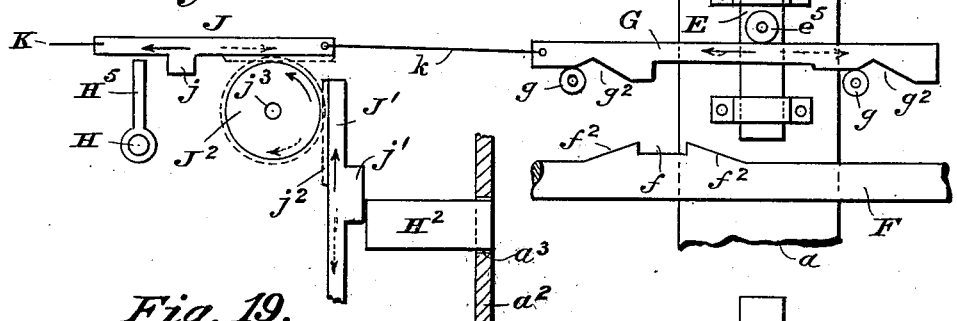
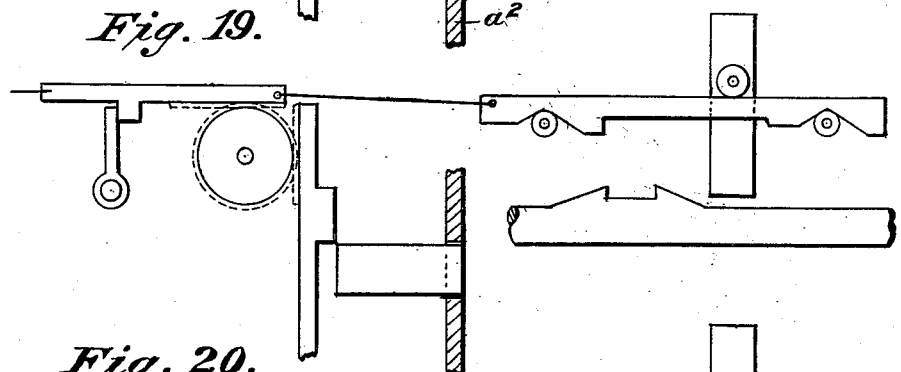
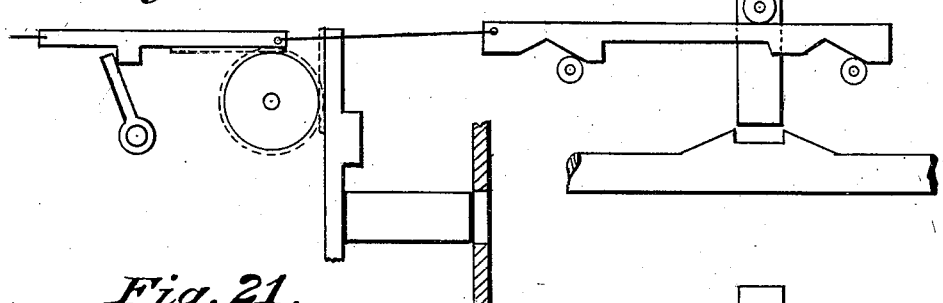
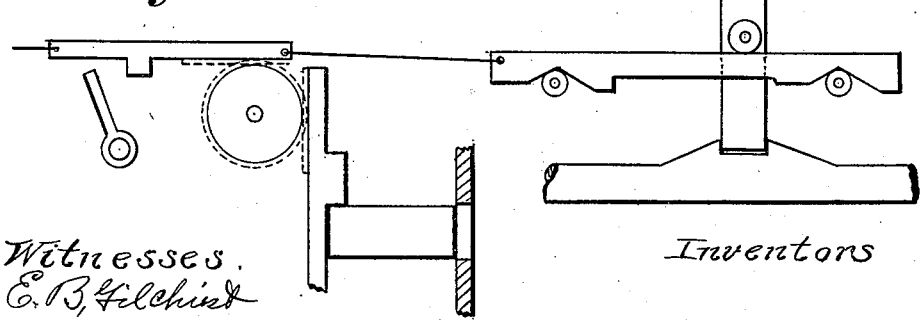
Witnesses.
E. B. Gilchrist
H. R. Sullivan
Inventors
Dwight B. Van Dorn
John T. Whitehouse

UNITED STATES PATENT OFFICE.

DWIGHT B. VAN DORN AND JOHN T. WHITEHOUSE, OF CLEVELAND, OHIO, ASSIGNORS TO THE VAN DORN IRON WORKS COMPANY, OF CLEVELAND, OHIO, A CORPORATION OF OHIO.

PRISON-CELL-DOOR MECHANISM.

1,007,316.  Specification of Letters Patent.  Patented Oct. 31, 1911.

Application filed June 6, 1910. Serial No. 565,214.

*To all whom it may concern:*

Be it known that we, DWIGHT B. VAN DORN and JOHN T. WHITEHOUSE, citizens of the United States, and residents of Cleveland, in the county of Cuyahoga and State of Ohio, have invented a certain new and useful Improvement in Prison-Cell-Door Mechanism, of which the following is a full, clear, and exact description.

This invention relates to locking mechanism for prison-cell doors in which key locks on the cell doors are dispensed with and suitable mechanism provided for opening or closing and locking or unlocking any or all of the doors of a series of cells opening upon a common corridor, said mechanisms being adapted to be operated and controlled from a position outside of said corridor and closed off or otherwise made inaccessible therefrom so that the operator may be kept from intimate personal contact with the prisoners and safe from any sudden attack by them when released from their cells to the corridor. Its principal objects are, first, to provide initial operative mechanisms mounted and inclosed in a suitable casing located outside of the corridor upon which the cell doors open, which casing will for convenience be hereinafter called the "lock box"; second, to extend from the mechanisms in this lock box suitable connections to the individual locking and operating mechanisms at each of the several doors of such a series, such connections being inclosed and guarded from access by a longitudinal steel casing extending the length of the corridor above all the doors, which casing for convenience will hereinafter be called the "box casing"; third, to provide and control from the lock box, certain snap-lock and dead-lock mechanisms at each individual cell door, which mechanisms are partially inclosed in the box casing above referred to but mainly in a steel pilaster or vertical casing standing at one side of each door opening and at the outer end of each partition wall between two cells. This vertical casing connects at its upper end with the said box casing and will hereinafter be referred to as the "jamb casing"; fourth, to provide means whereby the snap-lock mechanism is held under restraint in unlocked position while the door is open, but is tipped into release by the closing door and snaps into locking engagement with the door; fifth, to provide means controlled from the lock-box whereby such unlocked doors as are engaged by a longitudinally movable master bar may be moved simultaneously to open or closed positions, or held in any desired positions; sixth, to provide means whereby any unlocked door or selected plurality of unlocked doors may be released from said master bar and left free to be moved by hand from the corridor or from the interior of the cell to open them farther or to close and automatically lock them; seventh, to provide means located in the lock box whereby the individual lock-controlling mechanisms for the doors may be operated simultaneously by a general actuating mechanism associated with them in the lock box; eighth, to provide means located in the lock box whereby the individual controlling mechanisms of any door, or selected series of doors may be removed from the influence of such general actuating mechanism and the snap locks of such selected doors, dead-locked against action while their controlling mechanisms at the lock box remain in such positions; this removal of the controlling mechanisms of one or more of the doors from the path of the general actuating devices and the dead-locking of such doors in no way affecting the operation of the other doors while guarding against the accidental unlocking, etc., of the particular doors which it may be desired to leave closed and secured.

The invention, embodied in the form now deemed most desirable, is hereinafter described, specifically pointed out in the claims at the end of this specification and shown in the accompanying drawings in which:

Figure 1 is a front elevation of the corridor face of two cell doors of a series, the front cover plates being omitted from the vertical jamb casing at the left side of each door opening and also from the overhead box casing which extends the length of the corridor above all the doors; the vertical jamb casings containing the individual snap-locking and dead-locking mechanisms for their doors, and the overhead box casing the devices for operating the doors and the transmission connections from the lock box outside of the corridor to the individual mechanisms at the cell doors. Fig. 2 is a horizontal section of the same in the plane of the line 2—2 of Fig. 1 and the line 11—11 of Fig. 8. Fig. 3 is a front elevation of the lock box or casing located outside of the corridor and inclosing portions of the selective, operating and controlling devices of the doors and their locking mechanisms. Fig. 4 is an elevation partly in section on the lines 4—4 of Figs. 3 and 7, of the lock box, together with some adjacent portions of the first cell door of the series with portions of its individual locking and operating devices. Fig. 5 is a front elevation showing a portion of the selective operating mechanism located in the lock box, with the front of the box removed, and as seen from the direction of the arrows on the plane indicated by lines 5—5 of Figs. 4 and 6. Fig. 6 is a side elevation of the same partly in section on the lines 6—6 of Figs. 3, 5 and 7. Fig. 7 is a plan view partly in horizontal section on the plane of lines 7—7 of Figs. 3, 5 and 6. Fig. 8 is a front elevation, partly in section on the lines 8—8 of Figs. 2, 9, 10 and 11 of portions of the vertical jamb casing and overhead box casing, as they join, at one side of each cell-door opening. Figs. 9, 10 and 11 are horizontal sections on the planes of the respectively numbered section lines of Fig. 8. Fig. 12 is a rear or inside elevation, partly in section on the line 12—12 of Fig. 13, of a portion of the overhead box casing and a portion of the upper end of a door projecting therein and supported thereby, with various details of construction. Fig. 13 is a transverse sectional view of the same parts on the line 13—13 of Fig. 12. Fig. 14 is a detailed view of the sleeve nut and grooved spindle, in transverse section on the line 14—14 of Fig. 6. Fig. 15 is a perspective detail of a short section of the pilaster or jamb casing which incloses the snap lock devices of the cell door. Fig. 16 is a sectional view of the same on the line 16—16 of Figs. 11 and 15. Fig. 17 is a diagrammatic perspective view showing a single train of the principal elements necessary to carry out the operation of the mechanism for a single door. This figure is made for descriptive purposes chiefly, and without special regard for proportions or the exact relative planes or positions of the parts. Figs. 18 to 22, inclusive, are diagrammatic views showing the relative positions of parts of the snap lock and dead-lock mechanisms and also of the bolt connecting the door to the master bar, at several stages of locking, and unlocking the door, the actual relative positions and planes of coöperating parts being ignored to some extent for purposes of clearer illustration.

The invention is illustrated in its application to a series of cells separated by metallic-plate partitions $a^5$ and opening upon a common corridor, their corridor ends being closed at one side by a fixed grating A' which leaves an opening at the other side to be closed by a sliding grilled door A, carried by a hanger $a$, provided with rollers $a'$, on a track rail $b$, in the overhead box casing B. See Figs. 1, 4, 12 and 13. At the side of the door opening, opposite the fixed grating, is a vertical pilaster or jamb casing C which preferably stands in front of and is connected to the steel plate partition between two cells, (Fig. 2) and it contains the locking devices for its particular door. These jamb casings extend from the floor to and are connected with the box casing B which extends along the corridor above all the doors and connects with the lock box D located in an ante-room outside of the corridor. The overhead box casing B contains parts of the individual door-locking and door-moving mechanisms and also the transmission rods, etc., extending from the lock box D in the ante-room to the several doors along the series. The side plates $c'$ of the jamb casing extend upwardly through the box casing forming partitions therein which are suitably apertured for the passage of the several longitudinal elements and members of the locking devices which cross its plane.

Each door A comprises a rectangular frame of flat bars on its outer side and bottom end, with a vertical angle bar $a^2$ on its front side and a vertical hanger plate $a$ at its top which is flanged inwardly at its lower edge, the space thus inclosed being grilled by suitable vertical bars and cross braces as shown. The angle bar $a^2$ is disposed with the flat face of its longest leg outwardly and parallel with the plane of the door. It is adapted to pass into a vertical slot $c$ of the jamb casing C and is apertured at $a^3$ to be engaged by a snap bolt in said casing. The hanger plate $a$ extends upwardly through a narrow slot $b'$ in the bottom of the box casing B within which it supports the guide rollers $a'$ as stated. See Fig. 13.

A connecting bolt E vertically movable in bearing lugs on a guide bracket E' adjustably mounted on a base frame $E^2$ rigidly secured to the inner face of the hanger plate $a$, is adapted to engage a notch $f$ in a longitudinally movable master bar F in the box casing and thereby connect the door to said master bar. The notch $f$ in the master bar is formed in a plate $f'$ having inclined sides $f^2$ at each side of the notch and is rigidly secured to the bar. In order to adjust the door relatively to the notch in the master bar and thereby admit of each door being brought to its exact locking position, the guide bracket E' which carries the bolt is so pivoted at $e$ on the base frame as to swing sidewise at its lower end, which end is held by a clamping bolt $e'$ moving in a slot $e^2$ in the base and by set screws $e^3$ passing through lugs $e^4$ rising from the base plate; see Figs. 12 and 13. The bolt is vertically movable on the guide bracket and carries a roller $e^5$ on its inner face which is engaged by an underlying, movable lift rail G carried by rollers $g$ and held in position by guard bars $g'$ supported upon the inner wall of the box casing. The lift rail is widened at each end and has shallow V-shaped notches $g^2$ in its lower edge to receive the supporting rollers $g$. This lift rail is movable endwise and when so moved, by means controlled at the lock box D, the inclined sides of its notches $g^a$ resting on the rollers $g$ raises or lowers the rail bodily as the case may be.

Within the pilaster or jamb casing is the snap-lock device for the door comprising a vertical shaft H rotatable in suitable bearings in the casing and provided near its lower end with a lever arm H' engaging a notch $h$ in a horizontally movable lock bolt $H^2$ mounted in a housing $h^2$ rigidly secured to the inner walls of the casing. A socket $h^3$ contains a strong spiral spring $h^4$ which bears against the lever arm H' and tends to rotate the shaft in a direction that will move the bolt $H^2$ to locking position. See Figs. 8, 11 and 17, in which, however, the bolt is shown in retracted position. The rear wall of the notch $h$ in the bolt is of an exact height to free the lever arm H' and allow it to pass out of the notch when the bolt is fully retracted whereby the shaft is freed for further rotation in this direction. When the lever arm leaves the notch the bolt is held against accidental movement toward locking position by its curved face $h'$ standing in opposition to the end of the lever H'. When the shaft H is turned against the stress of the spring $h^4$ to unlock the bolt it is caught and held in unlocked position by a dog $H^3$ engaging a holding cam $H^4$ secured on the upper end of the shaft. The dog is pivoted at $h^5$ under the top plate of the box casing and is pressed into engagement with the cam by a spring $h^6$ and is carried by a guard plate $h^7$ which has an extension $h^8$ underlying and supporting the free end of the dog, which end extends beyond the cam and is notched to suitably engage it as shown in Figs. 9 and 17. At the top of the hanger plate $a$ of the door is secured a bracket I provided with a trip finger $i$ adapted, when the door is nearly closed, to extend through an opening $c^2$ near the top of the partition plate $c'$ (see Figs. 1, 8, 9 and 13) and contacting with the dog $H^3$ and push it out of engagement with the holding cam $H^4$ thus releasing the shaft and allowing the lever arm H' to throw the lock bolt $H^2$ into locking position across the slot $c$ of the jamb casing and through the aperture $a^3$ of the door angle which enters the slot as the door closes. The bracket I also carries a buffer rod $i'$ actuated by a spring $i^2$ to project its end in advance of the door frame. When the door is being closed this rod engages a suitable fixed obstruction, in this case the partition wall $c'$, which halts the rod and compresses its spring during the short continued movement of final closing of the door, thereby storing power in the spring which, when the door is next unlocked and released, will push and give the door an initial opening movement of several inches, serving to carry its front angle bar out of the slot $c$ in the jamb casing and entirely out of range of the locking devices, and it also serves to retract the tripping finger $i$, leaving a cleared space for the dog $H^3$ to engage the holding cam $H^4$ when the snap-lock mechanism is reset. The shaft H is turned to the unlocking position by means of a lever $H^5$ secured to the shaft and having its free end standing in the path of a projecting lug $j$ on an endwise reciprocal rack bar J controlled from the lock box in the anteroom. In the normal position of the parts, or when the snap lock is in locking engagement with the door, this lever $H^5$ stands in such relation to the lug $j$, shown by dotted lines in Fig. 10, and by full lines in Figs. 18, 19 and 22, that when the rack bar J has made a certain amount of preliminary movement in its operation to unlock the door, etc., it will encounter this lever and by continued movement swing it and rock the shaft H, thereby moving the snap lock back and the holding cam $H^4$ into engagement with the dog H. The return movement of the rack bar leaves the shaft H and its several parts as just described, this movement of the rack bar merely serving to set the shaft and the snap lock in unlocked, caught position.

Associated with the snap lock is a deadlocking device comprising a heavy, vertically movable bar J', supported in guides against the rear wall of the jamb casing in the path of the lock bolt $H^2$ and having a solid dead-block $j'$ attached at that portion of it near the lock bolt. When the lock bolt is unlocked this dead block stands above its back end but when the lock bolt is shot the dead block drops behind it forming a solid backing to prevent retraction of the bolt while the dead block is in this position. The dead lock bar J' extends up through the jamb casing and into the box casing where its width is reduced and a gear rack $j^2$ formed on its edge. This rack engages a gear wheel $J^2$ which is mounted on a fixed bearing $j^3$ and is also engaged by the rack bar J before referred to. This rack bar is connected at one end by the rod $k$ to the lift rail G before referred to, and at the other has a rod connection K leading to the controlling mechanism in the anteroom. When the rack bar J is moved in the direction of the full line arrows on Figs. 1, 8 and 17, to unlock the door, it draws the lift rail G to raise the door bolt E out of engaging range of the notch $f$ of the master bar F and at the same time, through the gear wheel $J^2$, raises the lug $j'$ of the dead-lock bar $J'$ from behind the lock bolt $H^2$. In its continued movement the rack bar lug $j$ encounters the lever $H^5$ at the position shown by dotted lines, Fig. 10, and moves it to position shown by full lines, which movement rotates the shaft H, and effects the complete retraction of the lock bolt $H^2$ and engagement of the dog $H^3$ with holding cam $H^4$. The connecting rod K, extending toward the ante-room, is subjected to tension strains in pulling the previously described parts into unlocked positions and the weight of the dead-lock bar $J'$ acts as a counter force to restore the parts when the tension on rod K is slackened.

The master bar F lies close to the bottom of the box casing, extends over every door in the series and above each door is provided with a notched plate $f$ adapted to engage the connecting bolts E at the top of the door. These bolts, as before stated, may be raised above the plane of the notches $f$ by the lift bars G and thus held out of engagement with the notches $f$ as the master bar is reciprocated. If, however, the bolt E is lowered to the plane of engagement it will be lifted by an incline $f^2$ of the plate $f'$ and drop into the notch $f$ and thus connect the door to the master bar so that it will be moved to open or closed positions thereby. This master bar is independently movable and may be dead locked at either extreme of its throw. It is operated by a lever $F'$ on the lock box D. This lever half turns a gear wheel $F^2$ engaging gear teeth $f^3$ on a vertically movable rack bar $F^3$ provided at its upper end with another set of gear teeth $f^4$ engaging a gear wheel $F^4$ mounted on a shaft $f^5$ supported in suitable bearings and provided with a crank arm $F^5$ to which is pivotally connected a link bar $F^6$ extending from the anteroom into the end of box casing B, where, through suitable connections, it operates the master bar, see Figs. 3, 4, 7. A pair of spring clamping devices $x$ and $x'$ extend from the wall of the casing (as shown in Fig. 3) and yieldingly hold the lever in either of its two positions way up or way down. In order to economize space these connections are of such a nature as to move the master bar twice as far as the half turn throw of the crank $F^5$. To accomplish this the link $F^6$ is connected to the shaft journals $f^7$ of a reciprocal gear wheel $F^7$ which engages at its top with the teeth of a fixed gear rack $F^8$ and on its lower side with a gear rack $F^9$ rigidly secured to the end of the master bar, see Figs. 4 and 17. In this arrangement the upper side of the gear wheel $F^7$ being held by its engagement with the fixed rack $F^8$ its peripheral movement at this point of contact is zero relatively to the longitudinal movement of the shaft $f^7$ while its lower side moves in the same direction as the shaft but twice as fast, therefore imparting to the rack $F^9$ a longitudinal movement twice as great as that of the shaft $f^7$. The gear rack bar $F^8$ is secured to and longitudinally adjustable on a bracket $F^{10}$ rigidly fastened to the inner wall of the box casing. Bolts $f^8$ pass through slot $f^9$ in the bracket $F^{10}$ and are screwed into the rack bar while set screws $F^{10}$ pass through lugs on the ends of the bracket and bear upon the ends of the rack bar. This adjustment of the rack bar acts, through the gear wheels to move the master bar and adjust its relation to the throw of the crank $F^5$.

The means for controlling the several described agencies at each door, through the tension rods K, are located in the lock box D in the anteroom, each door mechanism having its individual rod K connecting with its individual controlling mechanism at said lock box. In the organization of this controlling mechanism simplicity of construction and operation, efficiency and certainty in action, lessened liability of mistakes, and economy of room are prime considerations.

At the anteroom end of the rod K it is connected to a gear rack $k'$ endwise reciprocal in suitable guides and engaged by a gear wheel K' mounted on a vertical bearing shaft $k^2$. Another gear rack $K^2$ disposed at a right angle to the rack $k'$ and endwise reciprocal in suitable guides is provided on one side with a set of gear teeth $k^3$ which engage the gear wheel K' and on the other side, at a proper distance from the first, with another set of gear teeth $k^4$ which engage a gear wheel L' on the upper end of a vertical rotatable spindle L mounted in suitable guides in the lock box. Deep spiral grooves $l$ cut in the spindle are engaged by suitable lugs or lands $n$ in the bore of a long sleeve nut N (see Fig. 14) which is rigidly secured to the upper end of a vertically movable bar O mounted in suitable supports $o$, $o'$ in the lock box D. The sleeve nut N is provided with a side lug $n'$ on which is mounted a roller $n^2$ which takes into a guide slot $p$ in a plate P extending across the lock box D near its front face, which roller reciprocates in the slot and prevents the sleeve and attached bar O from turning. The sleeve is recessed at $n^3$ a suitable distance below the end of the grooved spindle to permit it to rise on the spindle above the position shown in the drawings. On the sleeve is a rearwardly projecting foot $n^4$ and a rearwardly projecting lug $n^5$ for purposes to be presently explained. The bar O between its bearing supports $o$ and $o'$ is provided with a collar Q which limits its upward movement by contact with support $o$ and it is also provided with a strong spiral spring $Q'$ having sufficient expansive force to easily raise the bar, collar, etc. While it is convenient in this embodiment of the invention to use springs to raise these bars, it will be understood that counterweights or other suitable means for obtaining yielding force may be employed in their stead for this purpose, and the term spring pressure used herein is intended to cover any such means. Above the bar guide $o$ is a movable locking slide R adapted to engage and hold the bar down to its normal semi-depressed position as shown in the drawings. This locking slide is mounted in a suitable bracket, (see Figs. 4 and 6) secured to the bar guide $o$ and having two upward extensions $r$ and $r'$ which support and guide the slide member. Two studs $r^2$ and $r^3$ project from the rear extension $r'$ and engage apertures in the slide member, the upper one of which forms a deep socket for the reception of a spring $r^4$ lying between the bottom of the socket and the end of the stud $r^2$ to press the slide forward. The front extension of the bracket is apertured for the passage of the locking toe $r^5$ of the slide and also for the passage of a push rod $r^6$ which projects through the front $d^3$ of the lock box and carries a finger piece or button $R'$. The bar O is preferably slotted as at $o^2$ for the reception of the toe of the slide and the passage through it of the push finger rod $r^6$.

A lever S is pivoted at $s$ in the lock box and projects out of the front of the box through a slot $s'$ and also preferably passes through a slot $o^3$ in the bar O. It is connected by a link T to the lug $n^5$ on the sleeve nut.

A depressor lever U pivoted at $u$, extends across the lock box in rear of the sleeve nuts and has links W pivotally connected to it at $u'$, said links being pivotally connected at their lower ends to pivots $w$ on lever arms W' secured on a rock shaft $W^2$ which extends across the lock box. This shaft is supported in suitable bearings $w'$, $w'$ in the lock box and projects out of it at the left side, Fig. 3, where it is provided with an operating lever X. A spring clamping device $x^2$ (Figs. 3 and 4) extends from the rear wall of the lock box and holds the lever X in its normal raised position of rest. When these several parts are in their normal positions, which they occupy when the cell doors are closed and normally locked, the depressor bar U, when rocked toward the sleeve nut N will engage the top of the projecting foot $n^4$ on the upper end of the sleeve and in its continued movement will bear down upon and depress the sleeve N and bar O to a lower position against the stress of the lifting spring $Q'$ at the lower end of said bar for a purpose to be explained later. The master bar F and this depressor lever U are both common to all of the door mechanisms, but all of the other parts heretofore described relate to a single system or train of mechanism for a single door, which system is duplicated for every door in the series. The rack bars $k'$ are arranged in vertical order in their guide block as shown in Figs. 3, 4, 5, 6 and 7, the corner gear wheels $K'$ are stacked upon the common bearing pin $k^2$. The rack bars $K^2$ are disposed in vertical series in proper guides and their gear racks $k^3$ engaging the wheels $K'$ are all alike, but the bars are progressively lengthened as they rise in the series, and their gear racks $k^4$ are correspondingly and successively farther removed from the racks $k^3$ to adapt them to the positions of the gear wheels $L'$ on the grooved spindles L. These spindles are successively lengthened from right to left in the series to support their wheels $L'$ in the successively higher planes of their respective rack bars $k^4$ in the series.

In the operation of the devices the several mechanisms immediately associated with each door, to lock or unlock and release it, are operated through the draw rods K, the movements of which are controlled by the sleeve nuts N which rotate the spindles L. When the sleeve nut is raised the spindle is rotated in the direction of the dotted arrow therein (Fig. 17) and obviously in the reverse direction of the full line arrow when the sleeve nut is depressed, the resulting movements of the several members affected thereby being shown by corresponding dotted and full line arrows. Now, when the door is closed and normally locked, or when it stands open with its snap lock set and ready to engage the closing door, those parts of the controlling devices shown at the left of Fig. 17 (supposed to be inclosed by the lock box D) are, generally, in the positions shown in said figure. The individual depressing levers S of which there is one for each door in the series, project out through slots $s'$ in the front face of the lock box, the slots or levers being suitably marked to indicate the respective doors to which they belong. The levers S may be moved to any one of three positions which are indicated by lines on the front face of the lock box and preferably marked "Deadlocked" "Locked" and "Unlocked" respectively. These positions of the levers indicate the state or condition of their respective coöperating mechanisms. The sleeve nuts and their bars are all raised, when permitted, by their lifting springs $Q'$ and they may be lowered, individually, through their levers S, or in multiple by the general depressor lever U engaging all of the projecting feet $n^4$ of the sleeves which stand in its path. The pull on the rod K, caused when the sleeve is being depressed below its normal position, effects the raising of the deadlock block *j'* from behind the snap lock bolt H² and also the raising of the door-connecting bolt E above the plane of engagement with the notch *f* of the master bar F. The next effect is to carry the lug *j* on the rack bar J into contact with the lever H⁵ and draw back the snap lock, releasing the door and permitting it to be pushed open by the spring plunger *i'* a sufficient distance to carry its trip finger *i* out of the way of the dog H³ and admit of its engagement with the holding cam H⁴ to hold the snap lock in reset position. The sleeve nut, after its depression to unlock the door, is immediately raised by the lever S or by the spring Q' to its normal position, thereby lowering the door-connecting bolt E so that it may be engaged by the notch *f* of the master bar and the door moved or held in control thereby. All of the foregoing operations are those pertaining to normal locking only, as distinguished from the dead locking of any selected door or number of doors of the series.

To effect dead-locking the sleeve nut must be raised above its normal position to that shown in dotted lines in Fig. 6, in which position its projecting foot *n*⁴ will be raised above and out of the path of the general depressor lever U, so that it cannot be borne down when said lever is swung to depress other sleeve nuts of the series. The sleeve nut and its attached bar are held in normal position, against the uplift of the spring Q', by the spring-pressed locking slide R engaging the slot *o*² in the bar O. The push rod *r*⁶ with its finger button R' enables the operator to move the locking slide back out of this engagement and permit the bar and sleeve nut to rise to the dead-locking position (shown by dotted lines) where they will be held by the uplift of the spring Q' until brought down by the lever S and again engaged by the locking slide. The raising of a sleeve nut above its normal position, as just described, not only removes it from the field of action of the general depressor lever U, but also, through turning the grooved spindle L, in the direction of the dotted arrow, slackens the tension on the rod K and permits the dead-lock lug *j'* to drop still lower than normal, behind the snap-lock bolt H². It also has the effect of moving the lift rail G to the right and raising it sufficiently to raise the door-connecting bolt E above the plane of engagement with the notch *f* on the master bar. Briefly, this upward movement of the sleeve nut isolates it from the general depressor lever U and prevents connection of its door with the master bolt, so that the depressor lever and the master bar may be freely used in operating all other doors not so connected.

Figs. 18 to 22, inclusive show various phases of the relative positions of the parts of door-locking and operating mechanisms at several stages of unlocking the snap-lock, releasing the door therefrom and engaging it to the master bar. In Fig. 18 the parts are shown in positions assumed when the door is closed and normally locked. The snap-bolt H² engages the aperture *a*³ of the door angle *a*²; the lug *j'* stands partially behind the snap-bolt, semi dead-locking it; the lift rail G is resting upon the rollers *g* at the lowest point of its edge, thereby raising it to a plane high enough to raise the door-connecting bolt E above the plane of engagement with the notch *f* of the master bar F. A part of the door-hanger plate *a* upon which the bolt E is slidably mounted is shown, said plate moving with the door and the roller *e*⁵ riding along upon the lift rail G. Fig. 19 shows the start to unlock the door. The sleeve nut (not shown in these figures) is lowered, and the draft upon the rod K moves the parts operated by it to the positions shown in this figure, in which the dead-lock lug *j'* is raised above the plane of the top of the snap bolt H² leaving free passage for the retraction of said bolt; the lug *j* on the rack bar J engages the lever H⁵ and the lift rail is drawn to a position where the rollers *g* stand in the deepest part of the rail notches *g*². Fig. 20 illustrates the effect of continued pull on the rod K. The rack J is moved to the end of its throw and its lug *j* rocks the lever H⁵ to the position shown in this figure, which rocking movement, through the shaft H, etc., causes the retraction of the snap bolt H². The dead lock lug *j'* is raised clear above the snap bolt H² and the lift rail, riding up on the rollers *g* at the far side of its notches, has lifted the door bolt E above the plane of the notches of the master bar. During these movements the door, when released from the snap bolt, is sprung back and opened a few inches by the spring plunger *i'* before mentioned. Fig. 21 shows the completion of the unlocking movements. When the sleeve nut is raised, immediately following its depression to unlock, the rod K is slackened and all of these immediately associated parts at the door are partially retracted by the weight and fall of the dead lock bar J' which drops until its lug *j'* is checked by and rests upon the top of the snap bolt H². This initial movement of the dead-lock bar draws all of the other parts to the positions shown in this figure. This initial movement of the dead-lock bar is through a small part only of its traverse in this direction, and it takes up only half of the slack in the connection K. The snap bolt is retracted and the door freed from its restraint, the lift rail rests with the deepest parts of its notches on the rollers *g* and the door-connecting bolt lowered to the plane of engagement with the notch $f$ of the master bar. If not already in engaging position when the bolt E is lowered, the master bar may be moved endwise until the bolt drops into the notch, the bolt riding up one of the inclines $f^2$ at either side of the notch. When thus connected to the master bar the door is positively controlled by it and may not be moved independently of it. If desired, however, the door may be disconnected from the master bar through a pull on the rod K from the lock box, raising the lift rail and door bolt while the master-bar notch is moved away from beneath the bolt. Fig. 22 illustrates the dead-locked position of these parts resulting from the lifting of the sleeve nut N above its normal position and out of the range of the general depressing lever U, as shown by dotted lines in Figs. 6 and 17, and thereby throwing additional slack into the rod K. It will be understood that this dead-locking preferably, though not necessarily, follows the normally locked position shown in Fig. 18, where the dead-lock lug $j'$ is already behind the snap bolt. Now this additional slacking off of the rod K permits the dead-lock lug $j'$ to sink still lower behind the snap bolt and this movement causes the lift rail G to move along to the right with its parallel surfaces $g^3$ resting upon the rollers $g$ retaining the rail at its high level and holding the door bolt E above the plane of engagement with the notches $f$ of the master bar.

While the dead-lock bar is preferably made heavy enough to serve as a weight in drawing back the slack in the connecting rod K and to move its associated parts at the door, as described, it might be preferred to employ a separate weight or other suitable means to retract the connection K and perform the offices of the weight subject to the control of the dead-lock bar.

Having described our invention, we claim:

1. In a prison cell door, the combination of a vertical jamb casing at the closing side of the door opening and slotted along its entire length on the door side thereof, locking mechanism in the casing, with a slidable door having at its closing side a vertical plate extending substantially its entire length projecting beyond the edge of the door proper and adapted to pass into the said slot of the casing and there be automatically engaged by said locking mechanism.

2. In a prison-cell door, the combination of a vertical jamb casing at the closing side of the door opening and slotted lengthwise on the door side thereof, spring locking mechanism with means for restraining it in unlocked position, a slidable door having at its closing side a vertical plate projecting beyond the door proper and adapted to pass into said slot of the casing there to be engaged by said locking mechanism, with means carried by the door adapted to trip and release the said locking mechanism after said plate has entered the slot in the casing.

3. In a prison-cell door, the combination of a slidable door, an automatic locking mechanism adapted to engage and lock the door when closed, means for retracting said mechanism to unlocked position, means for holding said mechanism in restraint in its unlocked position, means carried by the door whereby in closing it trips said restraining mechanism and thereby releases the locking mechanism, with means adapted to automatically push open the unlocked and released door sufficiently to remove the said tripping device from the path of the lock-restraining means.

4. In a prison-cell door, the combination of a jamb casing having a vertical slot on the door side thereof, a slidable door having an apertured flange plate adapted to pass into said slot, a spring actuated bolt in the casing movable transversely across the path of said flange plate and adapted to engage the aperture therein, means for retracting said bolt, and means for holding it in retracted position, with means carried by the door adapted to trip said holding means and release the bolt, allowing it to move into locking position, and a spring plunger on the door adapted to engage a fixture and compress its spring on the final closing movement of the door to impart an initial opening movement to the door when it is unlocked.

5. In a prison-cell door, the combination of a jamb casing having a vertical slot on the door side thereof, a slidable door having an apertured flange plate adapted to pass into said slot in the casing, a bolt in said casing movable transversely across the path of said flange plate and adapted to engage the aperture therein, a vertical rock shaft in said casing, a lever on said shaft engaging the bolt, a spring urging the bolt to its locked position, means for rocking the shaft to retract the bolt against the pressure of said spring to unlocked position, a cam on the shaft, a pivoted spring-pressed dog adapted to engage said cam in its unlocked position, and a member on the door adapted to engage and trip said dog on the final closing movement of the door.

6. In a prison-cell door having a jamb casing with a vertical slot on its door side and a slidable door having an apertured flange plate adapted to pass into said slot, the combination of a spring pressed bolt in said casing adapted to engage the aperture in said door plate, a movable bar having a dead-lock block to lie behind the spring bolt when the latter is in locked position, with means for moving the dead lock out of the path of the spring lock, and means for retracting the bolt after the dead lock is so moved.

7. In a prison-cell door having a jamb casing with a vertical slot on its door side, and a slidable door having an apertured flange plate adapted to pass into said slot in the casing, the combination of a bolt in said casing adapted to engage the aperture in the flange plate of the door, a vertical rock shaft having a lever engaging said bolt, a spring pressing said lever and bolt to locking position, a second lever on the rock shaft, a vertically movable bar having a dead-lock block to lie behind the bolt, a geared rack on said bar, a pinion engaging said rack, a horizontal rack bar also engaged by the pinion and having a projection adapted to engage said second lever on the rock shaft, with means for longitudinally moving the horizontal rack bar whereby the dead lock is first raised and then the shaft rocked to retract the bolt.

8. In a prison-cell door having a suitable jamb casing, the combination of a horizontally movable spring-locking bolt in said casing, a vertical rock shaft operatively connected to said bolt, a lever on said shaft, a vertically movable dead-lock bar lying behind said bolt and provided with a gear rack, a pinion engaging said rack, a horizontally movable rack bar also engaged by said pinion, means for moving said rack bar a prescribed distance, and a projection on said rack bar adapted to engage the free end of the said lever on the rock shaft, said projection being so relatively disposed as to contact with said lever toward the latter part of its prescribed movement.

9. In prison-cell door mechanism having a slidable door and a movable master bar, the combination of a connecting bolt mounted upon and movable with the door and adapted to engage the master bar, with means for controlling the position of said bolt relatively to the master bar at any point within the range of movement of the door.

10. In prison-cell door mechanism having a slidable door and a movable master bar, the combination of a connecting bolt mounted upon and movable with the door and adapted to engage the master bar, with means for controlling the position of said bolt relatively to the master bar at any point within the range of movement of the door, and holding the bolt in desired relation to the master bar during any of its movements with the door by which it is carried.

11. In prison-cell doors, the combination of a series of cells having slidable doors in their openings, a master bar longitudinally movable in the same direction as the doors to all of which it extends, a notch in the master bar for each door, a bolt in each door adapted to engage its notch in the master bar, with means whereby the position of the bolt on the door may be adjusted in directions parallel with the movement of the master bar.

12. In prison-cell doors, the combination of a series of cells having slidable doors in their openings, a master bar longitudinally movable in the same directions as the doors to all of which it extends, a notch in the master bar for each door, with a slidable bolt on each door adapted to engage its notch in the master bar, a housing for said bolt secured upon the door in such manner as will admit of its adjustment in directions parallel with the master bar, means for clamping it against the door, and rigid lugs on the door having set screws which bear against the sides of the housing substantially as and for the purpose hereinbefore described.

13. In a prison-cell door, the combination of a slidable door, a box casing located above the door and slotted on its lower side, a vertical plate at the top of the door extending through said slot, a vertically movable bolt mounted on said plate, a longitudinally movable bar below said bolt and having a notch adapted to be engaged by said bolt, with means for controlling the vertical position of the bolt relatively to the plane of said notch.

14. In a prison-cell door, the combination of a slidable door, a box casing located above the door and slotted along its lower side, a plate at the top of the door extending through said slot, a bolt vertically movable in suitable guides on said plate, a longitudinally movable master bar below said bolt and having a notch adapted to be engaged thereby, with a movable lift rail supported on the casing and adapted to slidably support the bolt, and means for adjusting and maintaining the elevation of said lift rail as desired.

15. In a prison-cell door, the combination of a slidable door, a bolt vertically movable in suitable guides secured to the top of the door, a longitudinally movable master bar below said bolt and having a notch adapted to be engaged thereby, with a movable lift rail adapted to slidably support said bolt, said lift rail having notches with inclined sides on its lower edge, rollers mounted on fixed bearing pins supporting the lift rail on its lower edge, with means for moving the lift rail endwise on said rollers whereby its elevation is determined by the relative positions of said notches and rollers.

16. In a series of prison cells with doors opening upon a common corridor, the combination of a vertically movable connecting bolt on each door, an individual vertically adjustable lift rail at each door to slidably support said connecting bolt, and means for adjusting said lift rail, with a longitudinally movable master bar extending to all of said doors and having a notch with an incline at each side thereof for each door adapted to be engaged by said connecting bolts, with means for moving said master bar to open or close the doors connected therewith.

17. In a prison-cell door, the combination of a jamb casing, a spring-lock bolt in said casing, a slidable door adapted to be engaged by said spring-lock bolt, a vertically movable bar adapted to dead lock the spring-lock bolt, a longitudinally-movable bar adapted through suitable connections to raise the dead lock and retract the lock bolt to unlocked position, a vertically-movable connecting bolt supported at the top of the door, a longitudinally movable master bar below said bolt having a notch adapted to be engaged thereby, a movable lift rail adapted to slidably support said connecting bolt in its relation to said notch, and means whereby the endwise movement of said lift rail adjusts its elevation, said lift rail being connected to said first mentioned longitudinally movable bar whereby the lift rail is moved simultaneously with the locking and dead-locking mechanisms to set the connecting bolt in suitable relation to the master bar.

18. In a prison-cell door provided with suitable locking, dead-locking and door-moving devices, the combination of a horizontally movable gear-rack bar suitably connected with and adapted to control all of said devices, a pinion engaged by said gear-rack, a vertically movable dead-lock bar, a gear rack on said bar also engaging said pinion, with tension means for moving said first mentioned gear-rack bar in opposition to the weight of the dead-locking bar which weight serves to retract said gear-rack bar and its associated mechanisms when relieved from said tension restraint.

19. In a series of prison cells, the combination at each cell-door opening of a slidable door, a horizontally-movable locking bolt adapted to engage the door, a vertically movable bar adapted to dead-lock said locking bolt and in turn be checked in its descent by said locking bolt, a longitudinally movable master bar having a notch at each door, a movable connecting bolt on the door adapted to engage a notch of the master bar, means for controlling the position of said connecting bolt relatively to the plane of its engagement with said master bar notch, said means being controlled by and moving in unison with the dead-lock bar, whereby when the door is unlocked the dead lock is first raised, then the locking bolt retracted across the path of the dead lock and the connecting bolt moved out of the plane of the master bar notch, then the dead-lock bar is lowered until it is checked by and rests upon the rear end of the retracted locking bolt and the connecting bolt on the door brought to and held in engaging position for the master-bar notch.

20. In a prison cell-door locking and operating mechanism having at the cell a slidable door and a longitudinally movable master bar, the combination of mechanism at the cell door comprising a connecting bolt on the door adapted to engage the master bar, and means controlled by the dead-lock bar for controlling its position, a snap-locking bolt adapted to engage the door, a dead-lock bar adapted to engage and subsequently be engaged by said snap-lock bolt, with distantly located controlling means having flexible connection with said door mechanisms, and a weight at the door adapted to draw back on the flexible connection, the operation of the weight being controlled by the dead lock bar; said distant means being moved away from and then immediately returned to its normal position, thereby first pulling on the flexible connection, and then giving back its entire slack, the pull effecting the unlocking movements of the said parts at the door, and the slack, as drawn back by the weight, permitting said parts to return toward their locked positions.

21. In a series of prison cells, the combination at each cell-door opening of a slidable door, a locking bolt adapted to engage the door, a bar adapted to dead-lock said bolt when it is in locked position, a movable master bar having a notch at each door, a connecting bolt on the door adapted to engage said notch of the master bar, and means for controlling the position of the connecting bolt, said means being controlled by and moving in unison with the dead-lock bar, whereby when said bar is in dead-locking position the said connecting bolt is held out of the plane of engagement with said notch of the master-bar.

22. In a series of prison cells opening upon a common corridor and having slidable doors, the combination of a longitudinally movable master bar extending to all of the doors and at one end beyond the corridor, a notch in the master bar at each door with means for independently connecting each or any door to said master bar, a gear rack on that end of the master bar extending beyond the corridor, a reciprocal gear wheel engaging said rack, a fixed gear rack also engaged by said wheel on its side opposite the master bar, with draft links connected to the shaft journal of the said gear wheel, and means for moving them in the same direction as the master bar whereby the master bar is moved twice as fast and twice as far as the movement of said gear wheel.

23. In a series of prison cells opening upon a common corridor and having slidable doors, the combination of a longitudinally movable master bar to which the doors may be connected having one end extending beyond the corridor, a geared rack on this end of the master bar, a reciprocal gear wheel engaging said rack, a fixed gear rack also engaged by said wheel, a draft link connected to the shaft journal of the wheel, a crank arm to which said link is also connected, with means for turning said crank arm through a half revolution to aline it at the end of each half throw with said link whereby the master bar is moved a distance equal to twice the throw of the crank and it is dead locked against movement through any endwise force applied from the master bar while said crank is on either of its dead centers.

24. In a series of prison cells opening upon a common corridor and each having a slidable door, the combination of a longitudinally movable master bar to which the doors may be connected, having one end extending beyond the corridor, a crank operating through link connection to move said master bar, said crank making a half revolution only and stopping on its dead center relatively to said link connection, a concentric gear wheel attached to said crank, a vertically movable bar having a gear rack to engage said gear wheel, a second gear rack on the other end of said bar, and a pinion engaged thereby, a lever connected with said pinion and adapted to turn through a half revolution to full throw the master bar.

25. In a series of prison cells opening upon a common corridor and each having a slidable door, the combination of a longitudinally movable master bar to which the doors may be connected and which extend at one end beyond the corridor, a crank having link connection with said master bar, a concentric gear wheel connected to said crank, a vertically movable rack bar engaging said gear wheel, a pinion also engaged by said rack bar, with a lever connected to said pinion and adapted to turn it in either direction to reciprocate the master bar, with fixed clamps to engage and hold said lever at the ends of its throw.

26. In a series of prison cells having door openings upon a common corridor and an ante-room at the end of the series of cells and preferably inaccessible from said corridor, the combination of a box casing extending from said ante-room along the corridor above all the cell door openings and slotted at its bottom in front of each cell, a longitudinally movable master bar in said casing having a notch with inclined side approaches at each cell, a door at each cell having a top plate extending through the slot and into said box casing, a rail track in the casing and rollers, carried by the door plate, riding on said rail, a connecting bolt vertically movable in guides on the door plate, a vertically adjustable lift rail supported on the box casing and adapted to slidably support the said connecting bolt, means for controlling said lift rail, and a suitable connection extending from such means at each door through the box casing to controlling means in the ante-room.

27. In a series of prison cells having door openings upon a common corridor and an ante-room at the end of the corridor, preferably inaccessible therefrom, the combination of a box casing extending from said ante-room along the corridor above all cell door openings and slotted at its bottom in front of each cell, a longitudinally movable master bar in said casing having notches at each cell, a door at each cell having a top plate extending through the slot and into the box casing, means on said plate for slidably supporting the door on a rail in the casing, a movable bolt on said plate adapted to connect the door to the master bar, and means for controlling said connecting bolt, an automatic locking device adapted to engage the door when it is closed and a dead lock for such locking device, with means for retracting the automatic locking device, for controlling said dead lock and for controlling said connecting bolt, a tension rod or wire connected to said means and extending therefrom through the box casing to the ante-room and connecting to individual controlling means in said ante-room.

28. In a series of prison cells opening upon a common corridor and having doors each provided with suitable locking and moving mechanisms which are principally inclosed in a box casing extending along the corridor above the door openings to an ante-room at the end of the corridor, the combination of an endwise movable horizontal bar at each cell adapted to control the several individual mechanisms of the door referred to, a connecting rod extending in said box casing from said bar to operative and controlling mechanisms in said ante-room beyond the box casing, a rotatable spindle held against endwise movement and having screw grooves, a non-rotatable sleeve nut engaging the grooves of the spindle and adapted to move endwise thereon whereby said spindle may be rotated in either direction in accordance with the movements of the sleeve nut, a pinion on said spindle, a gear rack engaged and moved endwise thereby, with means for transmitting its movements to the connection rod leading to the door mechanism as described.

29. In a series of prison cell-door locking and operating mechanisms, controllable through individual longitudinally movable members associated therewith, in mechanisms adapted to move and control said members, the combination of rotatable screw spindles held against endwise movement, pinions on said spindles and gear racks engaged thereby non-rotatable sleeve nuts engaging said screw spindles and endwise movable thereon, with means for reciprocating said sleeve nuts.

30. In prison cell-door locking and operating devices, operable through reciprocal bars immediately associated therewith and suitably connected to distant individual operating and controlling means, the combination in each of said last mentioned means, of a rotatable screw spindle held against endwise movement, a pinion on the spindle, a horizontally reciprocal rack bar engaged thereby, a non-rotatable sleeve nut engaging the screw spindle and movable endwise thereon, means exerting lifting pressure on said sleeve nut, and means whereby the sleeve nut may be depressed to be immediately raised by said lifting means, whereby the spindle is rotated first in one direction and then in the other, thereby moving said rack bar longitudinally forward and backward, which movements are transmitted to the reciprocal bars at the cell doors.

31. In a series of prison-cell doors having locking and operating devices, as described, immediately associated with them and operable through suitable connections by a series of distant individual means, the combination in each of said distant means of a vertical screw spindle, a pinion on said spindle, a horizontally reciprocal rack bar engaged thereby, a non-rotatable sleeve nut engaging the screw spindle and movable endwise thereon, a bar extension of the sleeve nut passing through suitable guides, and a lever connected to said sleeve nut and adapted to longitudinally reciprocate the sleeve nut and its bar, with a lock casing inclosing the series of said means and having slots in its front face through which said operating levers pass, and graduation marks on its front face whereby the positions of said operating levers indicate the status of their respective locking mechanisms at the cell doors.

32. In a series of prison-cell doors having locking and operating devices, as described, immediately associated with them and operable through suitable connections by distant individual means, the combination in each of said means of a vertical screw spindle, a pinion on said spindle and a horizontally reciprocal rack bar engaged thereby, a non-rotatable sleeve nut engaging the screw spindle and movable endwise thereon, a bar extension on the sleeve nut passing through suitable guides and having a longitudinal slot, a spring pressing to raise said bar and sleeve nut, and a lever connected to the sleeve nut and adapted to depress it against the spring pressure, said lever also passing through the slot in said bar, a lock casing inclosing said devices, with slots in its front face for the passage of said levers.

33. In a series of prison cell-door locking and operating mechanisms controllable through individual longitudinally movable members associated therewith, in mechanisms adapted to move and control said members, the combination of rotatable screw spindles held against endwise movement, pinions on said spindles and gear racks engaged thereby, sleeve nuts engaging said screw spindles and endwise movable thereon, a plate adjacent to the sleeve nuts having guide slots parallel to the movement of the sleeve nuts and projections from said sleeve nuts taking into their respective slots in said plate to prevent the sleeve nuts from turning when moving endwise to rotate the spindles, with means for reciprocating said sleeve nuts.

34. In prison cell-door locking and operating devices operable through reciprocal bars immediately associated therewith and suitably connected to distant individual operative and controlling means, the combination in each of said last mentioned means of a rotatable screw spindle held against endwise movement, a pinion on the spindle, a horizontally reciprocal rack bar engaged thereby, a non-rotatable sleeve nut engaging the screw spindle and movable endwise thereon, means exerting lifting pressure on said sleeve nut, means to check the rise of the sleeve nut at its normal position below its extreme rise, and means whereby the sleeve nut may be depressed below said normal position to be immediately returned thereto by said lifting means, whereby said spindle is rotated first in one direction and then in the other thereby moving said rack bar longitudinally forward and back, which movements are transmitted to the reciprocal bars at the cell doors.

35. In a series of prison-cell doors having locking and operating devices as described immediately associated with them and operable through suitable connections by distant individual means, the combination in each of said means of a vertical screw spindle, a pinion on the said spindle, a horizontally reciprocal rack bar engaged thereby, a non-rotatable sleeve nut engaging the screw spindle and movable endwise thereon, a bar extension of the sleeve nut passing through suitable guides, and a spring pressing to raise said bar and sleeve nut, a spring pressed locking slide adapted to prevent the upward spring movement of the said bar and sleeve nut above their normal position occupied when the door is simply locked, and a lever connected to said sleeve nut and adapted to depress the sleeve nut and its bar against said spring pressure.

36. In a series of prison-cell doors having locking and operating devices as described immediately associated with them and operable through suitable connections by distant individual means, the combination in each of said means of a vertical screw spindle, a pinion on the said spindle and a horizontally reciprocal rack bar engaged thereby, a non-rotatable sleeve nut engaging the screw spindle and movable endwise thereon, a bar extension of the sleeve nut passing through suitable guides and having a longitudinal slot, a spring pressing to raise the said bar and sleeve nut, a slot in said bar and a spring pressed locking slide engaging said slot to limit the spring rise of the bar and sleeve nut above their normal position, occupied when the door is simply locked, a lever connected to the sleeve nut and adapted to depress it against the spring pressure, said lever also passing through the slot in the said bar, a lock casing inclosing said devices with slots in its front face for the passage of said levers, with rods on the locking slides also extending through the front face of the casing.

37. In a series of prison-cell doors having locking and operating devices as described immediately associated with them and operable through suitable connections by distant individual means, the combination in said means of a series of vertical screw spindles, pinions on said spindles, and horizontally reciprocal rack bars engaged thereby, non-rotatable sleeve nuts engaging the screw spindles and movable endwise thereon, springs pressing to raise said sleeve nuts, spring locking slides to check the upward movement of the sleeve nuts at the normal position occupied by them when the cell doors are simply locked, a general depressor lever pivotally supported adjacent to the sleeve nuts and extending across the entire series of them, lateral projections on the sleeve nuts which when in normal position stand in the path of said depressor lever, so that when said lever is rocked all of the sleeve nuts so engaged by the lever are depressed to cause the unlocking of their respective doors.

38. In a series of prison cell doors having locking and operating devices as described immediately associated with them and operable through suitable connections by distant individual means, the combination in said means of vertical screw spindles, pinions on said spindles and horizontally reciprocal rack bars engaged thereby, non-rotatable sleeve nuts engaging the screw spindles and movable endwise thereon, springs pressing to raise said sleeve nuts, locking slides to check the rise of the sleeve nuts above the normal positions occupied by them when the cell doors are simply locked, a general depressor lever pivotally supported adjacent to the sleeve nuts and extending across the entire series of them, lateral projections on the sleeve nuts which when in normal position stand in the path of said general depressor lever so that when said lever is rocked all of the sleeve nuts so positioned are engaged by the lever and depressed to cause the unlocking of their respective doors, with means for disengaging any one or more of the sleeve nuts from their said restraining locking slides and permitting their springs to lift them above their said normal positions thereby removing their lateral projections from the path of the general depressor lever, such further upward movement dead locking the cell-door locks and isolating their respective doors from any general unlocking movements, with individual means for depressing any sleeve nut to its normal position for reengagement by the said locking slide.

39. In a series of prison cell doors opening on a common corridor and having individual locking and operating devices as described immediately associated therewith, the combination of horizontal reciprocal rack bars at each cell to operate its mechanism, a series of similar horizontal gear-rack bars located beyond the end of the corridor vertically disposed and provided with rods of progressively increasing lengths connecting each of them to their respective companion rack bars at the cells, a vertically disposed series of horizontal independently rotatable gear wheels engaging the rack bars of said series and mounted in the planes of their respective rack bars on a common stud axle, a series of mechanisms for operating and controlling the distant cell-door locking devices arranged in a casing standing at a right angle to the line of the cells and corridor, a second vertically disposed series of horizontal gear-rack bars engaging said gear wheels on their sides farthest from the cells and reciprocal in a direction at right angles to the first mentioned series, said rack bars lying in the planes of their respective gear wheels, each of said rack bars being progressive longer than the one below it and each provided with a second gear rack on the opposite side from the first and at its end farthest from said corner gear wheels, with a series of vertical rotatable spindles of progressively increasing length arranged across said casing and carrying pinions arranged in the respective planes of and adapted to engage said last mentioned gear racks, with means for rotating said spindles as required.

40. In a series of prison-cell door locking and operating mechanisms each operable through a longitudinally movable bar immediately associated therewith, in mechanism adapted through suitable connections to move said bars, the combination of a series of vertically movable bars, springs pressing said bars upwardly, slide locks to check the upward movements of their bars at their normal positions which is below their upward limit of movement, to which they rise when said slide lock is disengaged from them, individual levers connected to said bars for depressing them, a pivotally mounted general depressor lever extending across the whole series of bars, projections on said bars adapted to be engaged by the general depressor lever when it is rocked to move said bars downwardly, said projections standing in the path of said lever at their normal positions and out of said path when raised above said normal positions, the downward moving of said bars below their normal positions acting to unlock and free their respective doors while their upward movement above said normal positions operates to isolate them from the action of the general depressor lever and also to doubly dead lock the cell doors as described.

41. In prison cell-door mechanism having locking and operating devices immediately associated with a series of cell doors on a corridor and individually operable through suitable means by distantly located mechanisms to set them in locking, dead-locked or unlocked positions, the combination in said distant mechanisms of a series of movable members which control through suitable connections their respective locking devices at the cell doors, each of said members being provided, first, with means to press the member in a direction to effect the locking of its door mechanism, second, means to check and hold the member in normal position with its door mechanism locked, third, means whereby any selected member or members may be released from said checking means and moved farther in locking direction whereby they assume positions in which they are exempt from the operation of the general unlocking means, and cause their respective cell doors to be dead locked, and fourth, means for moving the member individually against said pressing means in a direction to unlock the door mechanism, with general unlocking means adapted to engage all of said members which stand in its path when in their normal positions, and move them simultaneously in a direction to unlock their respective door mechanisms.

In testimony whereof, we hereunto affix our signatures in the presence of two witnesses.

DWIGHT B. VAN DORN.
JOHN T. WHITEHOUSE.

Witnesses:
THOMAS B. VAN DORN,
C. E. ROY.

Copies of this patent may be obtained for five cents each, by addressing the "Commissioner of Patents, Washington, D. C."